United States Patent [19]
Di Croce et al.

[11] Patent Number: 5,258,240
[45] Date of Patent: Nov. 2, 1993

[54] SOLID OXIDE FUEL CELL GENERATOR

[75] Inventors: A. Michael Di Croce, Murrysville; Robert Draper, Churchill Boro, both of Pa.

[73] Assignee: Westinghouse Electric Corp., Pittsburgh, Pa.

[21] Appl. No.: 32,749

[22] Filed: Mar. 17, 1993

Related U.S. Application Data

[63] Continuation of Ser. No. 774,934, Oct. 11, 1991, abandoned.

[51] Int. Cl.$^5$ .............................................. H01M 8/10
[52] U.S. Cl. .................................... 429/31; 429/32
[58] Field of Search ................................. 429/30-34

[56] References Cited

U.S. PATENT DOCUMENTS

| | | | |
|---|---|---|---|
| 3,526,549 | 1/1970 | Archer et al. | 138/86 |
| 3,607,416 | 9/1971 | Sizer et al. | 136/86 |
| 3,615,845 | 10/1971 | Gray | 136/86 |
| 3,880,670 | 4/1975 | Shinh | 136/86 R |
| 4,431,715 | 2/1984 | Isenberg | 429/30 |
| 4,476,197 | 10/1984 | Herceg | 429/32 |
| 4,476,198 | 10/1984 | Ackerman et al. | 429/32 |
| 4,490,444 | 12/1984 | Isenberg | 429/31 |
| 4,520,082 | 5/1985 | Makiel | 429/26 |
| 4,699,852 | 10/1987 | Yokoyama et al. | 429/31 |
| 4,791,035 | 12/1988 | Reichner | 429/31 |
| 4,874,678 | 10/1989 | Reichner | 429/30 |
| 4,876,163 | 10/1989 | Reichner | 429/30 |
| 4,894,297 | 1/1990 | Singh et al. | 429/31 |

FOREIGN PATENT DOCUMENTS

| | | |
|---|---|---|
| 1471773 | 3/1964 | Fed. Rep. of Germany . |
| 2514034 | 3/1975 | Fed. Rep. of Germany . |
| 46-039029 | 12/1966 | Japan . |
| 59-108278 | 6/1984 | Japan . |

OTHER PUBLICATIONS

Japanese Patent Application Publication (Kokai) 3-8266 Publication Date: Jan. 16, 1991; Assigned to Fujikuro Densen Co. Ltd. "Solid-Electrolyte-Type Fuel-Cell Module".

Primary Examiner—Anthony Skapars
Attorney, Agent, or Firm—Daniel P. Cillo

[57] ABSTRACT

A solid oxide fuel cell generator has a plenum containing at least two rows of spaced apart, annular, axially elongated fuel cells. An electrical conductor extending between adjacent rows of fuel cells connects the fuel cells of one row in parallel with each other and in series with the fuel cells of the adjacent row.

9 Claims, 4 Drawing Sheets

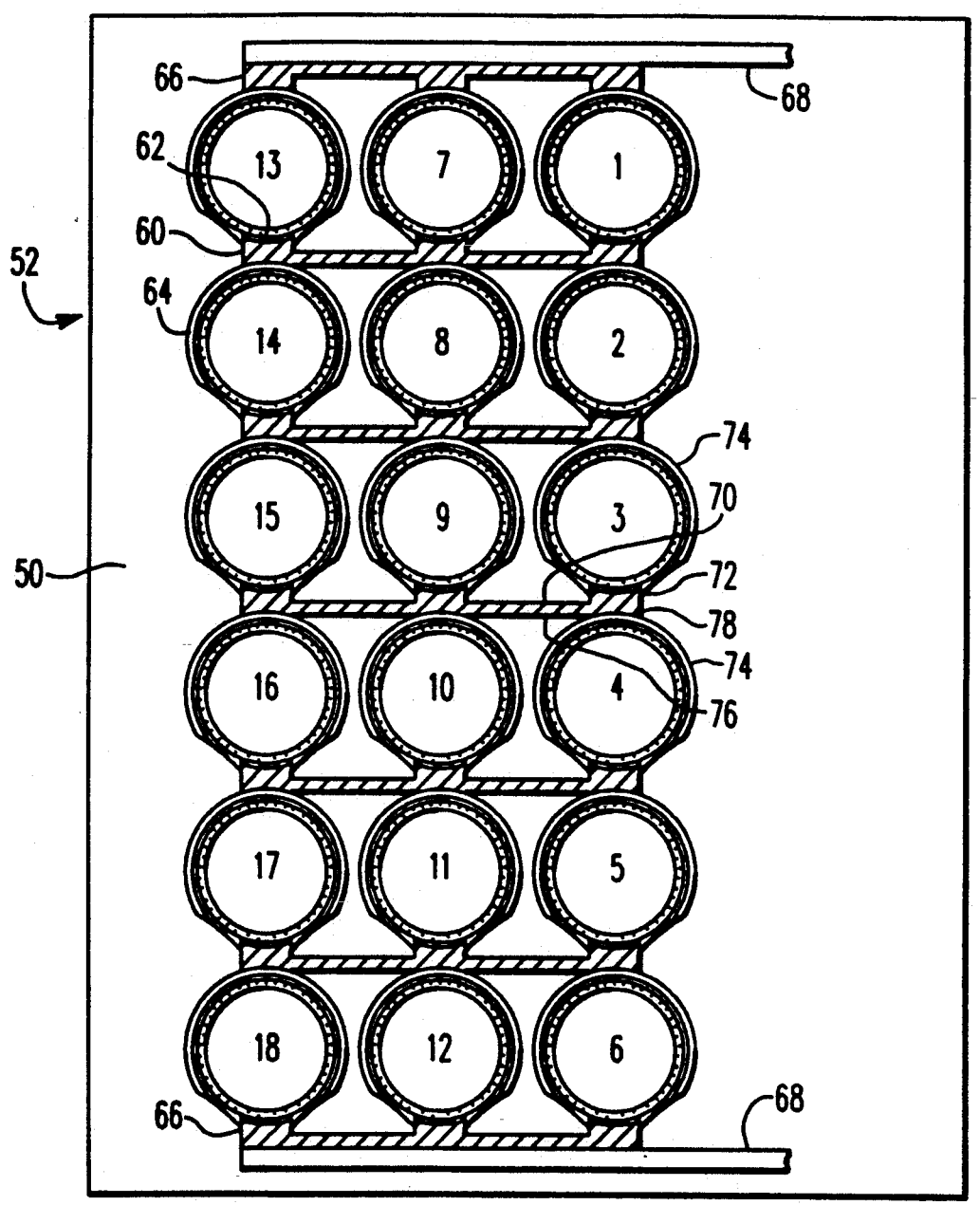
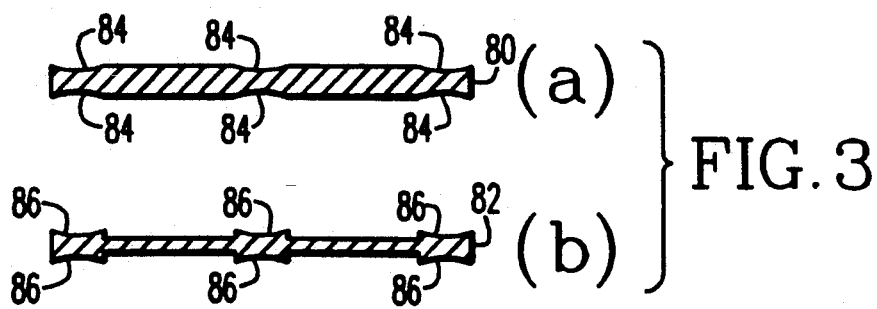
FIG. 2
FIG. 3

SOLID OXIDE FUEL CELL GENERATOR

GOVERNMENT CONTRACT

This invention was made in the performance of Contracts DE-AC0280ET-17089 and DE-AC2180ET 17089 with the United States Department of Energy.

This application is a continuation of application Ser. No. 07/774,934, filed Oct. 11, 1991 now abandoned.

BACKGROUND OF THE INVENTION

This invention relates to a solid oxide fuel cell generator and, more particularly, to a high temperature generator having spaced apart rows of spaced apart, annular, axially elongated fuel cells electrically connected in a series-parallel array by electrically conducting members.

High temperature solid oxide fuel cell generators are employed to convert chemical energy in a fuel gas, such as natural gas or a combusted gas containing hydrogen, carbon monoxide, methane and the like, into electrical energy. Thus, for example, gases from a fossil fuel power plant at temperatures over about 700° C. may be oxided by air in such a generator to produce electrical power and also environmentally acceptable water vapor and carbon dioxide. However each individual fuel cell in a generator only produces an open circuit voltage of about one volt. Also, each cell is subject to electrode activating energy losses, electrical resistance losses and ion mobility resistance losses which reduces its output to even lower voltages. Accordingly, a generator has many fuel cells electrically connected in series to produce the desired voltage. In addition, many fuel cells are electrically connected in parallel to produce the desired current. A generator designed to produce 500 KW of power, e.g., would literally have thousands of such fuel cells.

U.S. Pat. Nos. 4,431,715; 4,490,444; 4,520,082; 4,699,852; 4,791,035 and 4,894,297 generally disclose the structure and operation of generators employing spaced apart rows of spaced apart, annular, axially elongated fuel cells wherein the fuel cells of one row are electrically connected in series with the fuel cells of adjacent rows by axially extending felt strips. In addition, the fuel cells of each row are electrically connected in parallel by axially extending side felts. These patents are incorporated by reference for their disclosures. In the generators, each fuel cell is supported on a porous support tube which may be, e.g., a hollow calcia-stabilized zirconia tube having a wall thickness of 1 mm. An electrode (which will be assumed to be an air electrode for purposes of illustration) is deposited on the periphery of the support tube. A known air electrode comprises a 50 to 500 $\mu$m thick composite of doped or undoped oxides or a mixture of oxides of the perovskite family, indium oxide, rare earth oxides and oxides of cobalt, nickel, copper, iron, chromium and manganese. A nonporous solid electrolyte is deposited on the periphery of the air electrode. A known solid electrolyte comprises a 20 to 50 $\mu$m thick yttria-stabilized zirconia structure which substantially encompasses the air electrode. A small portion of about one radian or 50 degrees of the peripheral area of the air electrode extends axially along its length in contact with an interconnect material which may be an oxide doped (e.g., calcium, strontium or magnesium) lanthanum chromite film. The interconnect material extends outwardly through the solid electrolyte and a fuel electrode which is deposited on the periphery of the solid electrolyte. A known fuel electrode comprises a 50 $\mu$m thick cermet such as nickel zirconia. The fuel cells may be electrically interconnected by highly porous felt strips or other electrically conducting members extending between the outer fuel electrodes of adjacent fuel cells to establish parallel electrical connections or extending between the outer fuel electrodes of one row of fuel cells and the inner air electrodes (via the interconnect materials) of fuel cells in an adjacent row to establish series electrical connections. The felts may be sinter bonded nickel fibers where the fuel gas flows over the fuel cells in a plenum and the air (or other oxygen-containing gas) stream flows through the support tube. If the flows are reversed such that air flows over the fuel cells, the felt may be made from conductive oxide fibers such as indium oxide and the like.

FIG. 1 shows an array of 6 (series) ×3 (parallel) connected fuel cells 1-18 in the plenum 20 of a solid oxide fuel cell generator 22. Cells 1-6 are connected in series, as are cells 7-12 and cells 13-18. Axially extending felt strips 24 connect the adjacent fuel cells in series and axially extending side felt strips 26 connect the adjacent fuel cells in parallel. In addition, felt strips 28 extend between fuel cells 1, 7 and 13 and bus 30 and felt strips 32 extend between fuel cells 6, 12 and 18 and bus 34.

FIG. 1 shows that there are at least 33 felt strips 24, 26, 28 and 32 employed in this array. If the fuel cells 1-18 are 50 cm long and the felts 24, 26, 28 and 32 are about 15 cm long (which is a known design), then three times the 33 felt strips 24, 26, 28 and 32 (or ninety-nine) must be employed in the 6×3 array. Obviously the assembly of such an array is labor intensive and arduous. Each one of the felts 24, 26, 28 and 32 must be individually fabricated and applied. Additionally, the series felts 24, 28 and 32 and side felts 26 are applied in planes perpendicular to each other. This requires several step-by-step operations in applying the felts 24, 26, 28 and 32, including the application of nickel slurries, the application of the felts 24, 26, 28 and 32 themselves and drying steps. There are about a dozen steps in all.

In use, the performance of an array of fuel cells may change over time because of the changing condition of the strips. As FIG. 1 shows, the strips 24, 26, 28 and 32 cover much of the outer surface of each fuel cell 1-18. The strips 24, 26, 28 and 32 may be in contact with up to 80% or more of the fuel (i.e. outer) electrode. When the fuel gas flows over the fuel cells 1-18, the felt strips 24, 26, 28 and 32 may impede the flow of water vapor and carbon dioxide from the fuel cells 1-18, which tends to reduce the power density of the array. Also, the strips 24, 26, 28 and 32 may trap impurities, which further tends to reduce the flow of water vapor and carbon dioxide. In addition, uneven thermal stresses tend to develop in an array because the heat generated by the fuel cells in the peripheral portions of a plenum 20 of a generator 22 can be dissipated by conduction faster than can the heat generated by the fuel cells in the interior portions of the plenum 20. Further if a felt strip 24, 26 or 28 becomes non-conductive then an entire vector of fuel cells may be rendered substantially inactive.

SUMMARY OF THE INVENTION

It is an object of the present invention to simplify solid oxide fuel cell generators to reduce the number of steps (and cost) of assembling them.

It is another object of the present invention to reduce the contact area between the electrical conducting members and the outer electrodes of the fuel cells so that the power densities of the fuel cells are less sensitive to their condition.

It is a further object of the present invention to more efficiently transfer heat from the interior portions of an array to more efficiently conduct the current and to relieve uneven thermal stresses.

With these objects in view, the present invention resides in a solid oxide fuel cell generator having a plenum containing spaced apart rows of spaced apart, annular, axially elongated fuel cells. The fuel cells of a row are electrically connected in parallel with each other and in series with the fuel cells of an adjacent row by a unitized electrically conducting member. In a preferred embodiment of the invention, the conducting member is a strip having a first surface with shaped portions conforming to the cross-sectional profile of the adjacent fuel cells; and more preferably there are two surfaces having such profiles In a preferred embodiment of the invention the conducting member is a felt comprising metal or metal oxide fibers. In ,another embodiment, the conducting member is a metal foil. The conducting member may also be a composite of one or more alternating felt layers and foil layers.

DESCRIPTION OF THE DRAWINGS

The invention will become more readily apparent from the following description of preferred embodiments thereof shown, by way of example only, in the accompanying drawings, wherein:

FIG. 2 schematically shows the same 3×6 array of annular, axially elongated fuel cells in the plenum of a generator embodying the present invention;

FIG. 3 schematically shows electrically conducting members which may be employed in a generator embodying the present invention;

DESCRIPTION OF THE PREFERRED EMBODIMENTS

Figure 1:
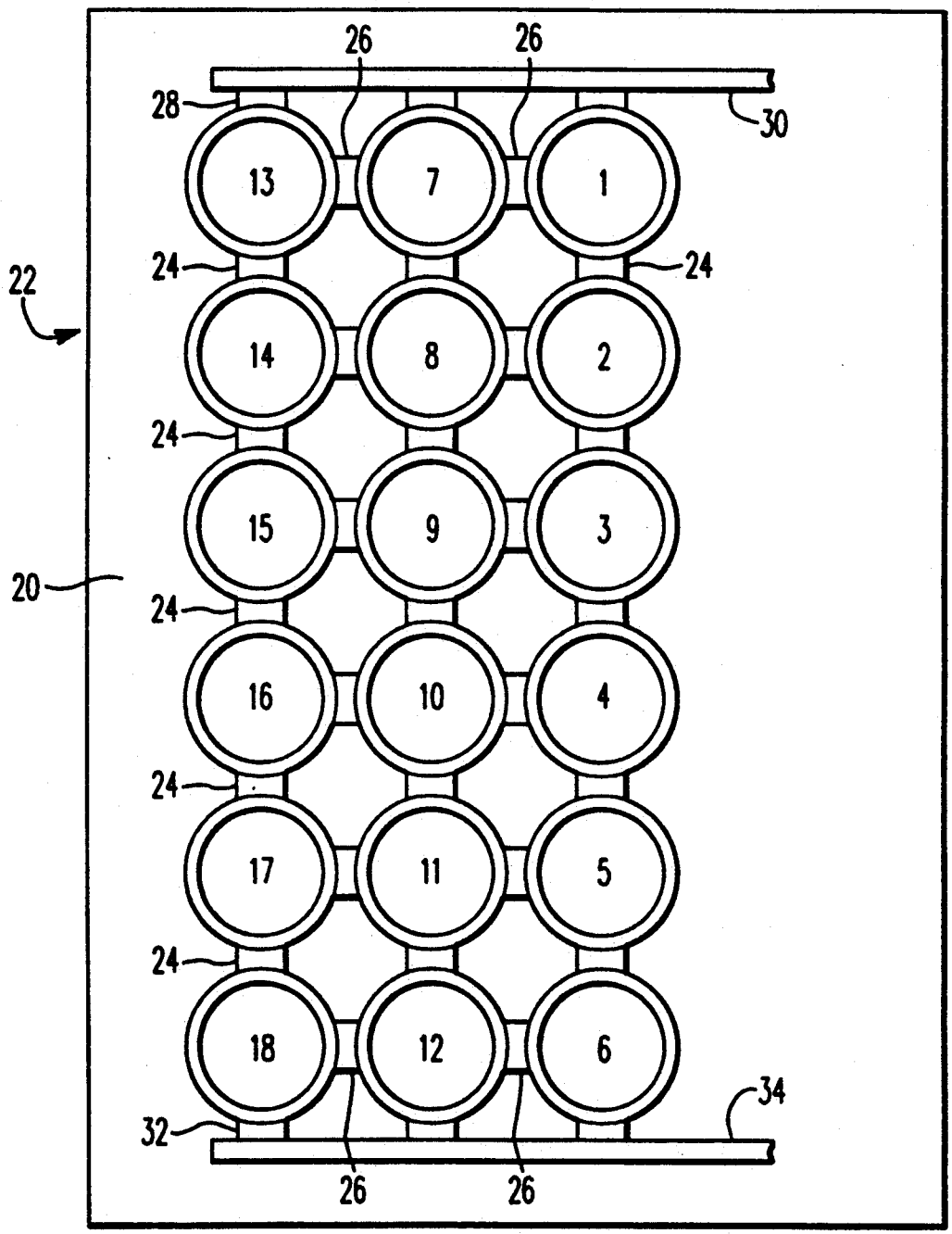
FIG. 1 schematically shows a state-of-the-art 3×6 array of spaced apart, annular, axially elongated fuel cells in the plenum of a generator.

In the preferred practice of the present invention, natural gas or an incompletely combusted gas is employed as a fuel gas on the plenum side of the generator. Air is preferably employed as an oxidizing gas flowing in the tubular supports for the fuel cells. Also other fuel gases and oxidizing gases may be employed in place of natural gas and air.

FIG. 2 shows the 6×3 array of fuel cells 1-18 in the plenum 50 of a generator 52 embodying the present invention. The array comprises rows of fuel cells such as, e.g., the row including fuel cells 13, 7 and 1, which are electrically connected in parallel by an electrically conducting member such as a strip 60 extending between their interconnect materials 62 (connected to the inner air electrodes). Fuel cells 13, 7 and 1 are also electrically connected in series with the fuel cells in the adjacent row, including fuel cells 14. 8 and 2, by the strip 60 which contacts their outer fuel electrodes 64. The generator 52 may also employ similar strips 66 to electrically connect the 3×6 array of fuel cells 1-18 with buses 68. In other embodiments, strips 62 may not be employed at all.

Strips 60 are preferably a felt of metal fibers such as nickel where the fuel gas is on the plenum 50 side of the generator 52. A metal oxide felt such as indium oxide may be employed in other embodiments of the invention. In the preferred embodiment shown, the strip 60 has a ratio of length along the fuel cell axis to fuel cell pitch of at least about 1. Advantageously, such strips may be slightly spaced along the axis of the fuel cells 1-18 to distribute the fuel gas in the plenum. In other embodiments of the invention the strip 60 may be a porous sheet which substantially extends the length of the fuel cells. In addition, the strips 60 may comprise a metal foil such as a nickel foil in, e.g., a composite of alternating layers of foil and sheet or in a single or multiple ply structure.

Preferably the electrically conducting strips 60 have a first surface 70 with shaped portions 72 conforming to the cross-sectional profile 74 of the fuel cells 1-18, such as fuel cell 3 as shown. Most preferably, the electrically conducting strips 60 have a second surface 76 with shaped portions 78 conforming to the cross-sectional profile 74 of the fuel cells 1-18, such as fuel cell 4 as shown. This structure advantageously mechanically restrains movement of the fuel cells 1-18 between the strips 60 which might cause electrical shorts even though there are no side felts such as felts 26 between fuel cells 1-18 in the generator 22 shown on FIG. 1. The fuel cells 1-18 preferably have top and bottom positioning boards (not shown) which support the array in place. FIG. 3 schematically shows two electrically conducting strips 80 and 82, both of which have shaped portions in its two surfaces which conform to the cross-sectional profile of the fuel cells 1-18. Strip 80 has somewhat recessed shaped portions 84 for closely packed fuel cells 1-18 Strip 82 has raised shaped portions 86 for more widely spaced fuel cells 1-18.

Figure 4:
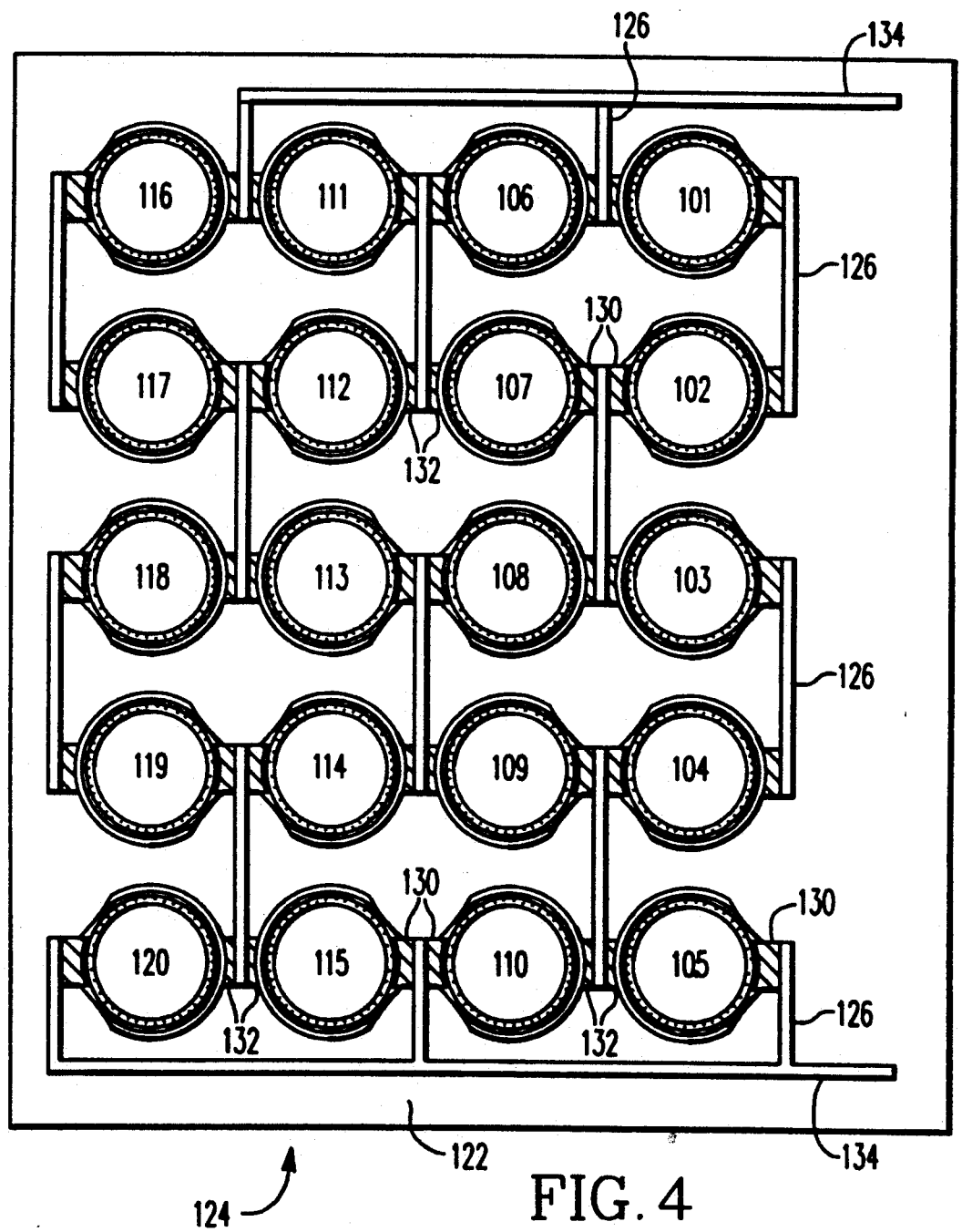
FIG. 4 schematically shows a second embodiment of a generator embodying the present invention.

FIG. 4 shows an embodiment of the present invention where a 4×5 array of fuel cells 101 to 120 are disposed in spaced apart rows in the plenum 122 of a generator 124. A plurality of shortened strips 126 (which may be a sheet, a foil or a composite of foil and fibers) electrically connecting adjacent fuel cells in a row, e.g., fuel cells 110 and 105, in parallel with each other and in series with the adjacent fuel cells in the adjacent row, e.g., fuel cells 109 and 104. Alternatively, the fuel cells 101-120 may be connected to shortened strips via interconnect materials to the inner air electrodes and to the outer fuel electrodes (not shown). In addition, the shortened strips 126 may be employed to electrically connect the array of fuel cells 101-120 with the buses 134. In this embodiment, a shorter conducting strip 126 is employed compared with the conducting strip 60 of FIG. 2.

Figure 5:
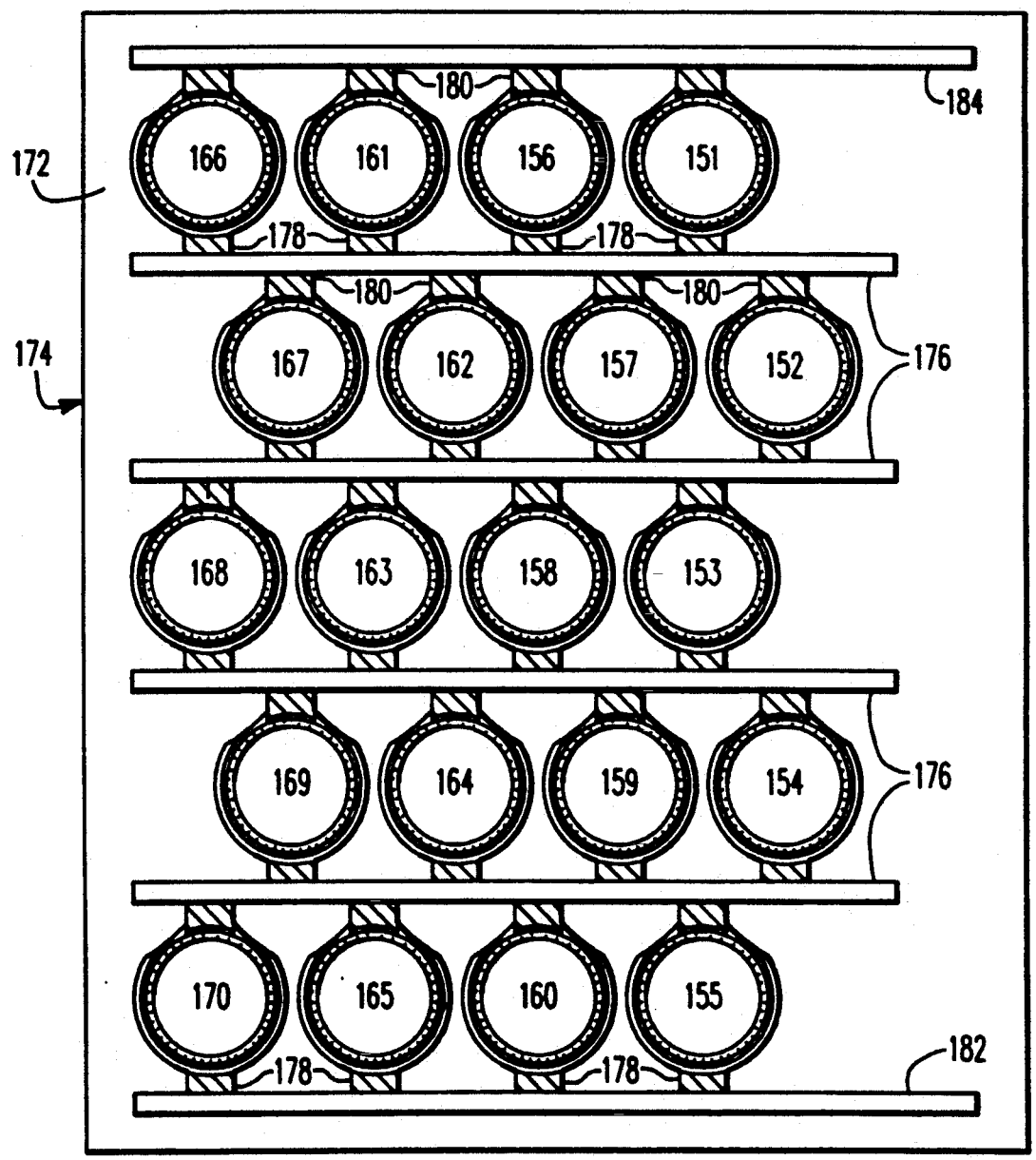
FIG. 5 schematically shows a third embodiment of a generator embodying the present invention.

FIG. 5 shows an embodiment of the present invention where a 4×5 array of fuel cells 151-170 are disposed in spaced apart rows in the plenum 172 of a generator 174. As shown, the fuel cells of a row, e.g., fuel cells 151, 156, 161 and 166 are electrically connected in parallel by a conducting member 176 (which may be a foil/fiber composite strip as shown) via interconnect materials 178 extending from their outer fuel electrodes. These fuel cells are also electrically connected in series with the fuel cells 152, 157, 162 and 167 of the adjacent row via interconnecting materials 180 extending from the inner air electrodes. In addition, the interconnect materials 178, 180 may electrically connect the array of fuel cells 151-170 with buses 182, 184 respectively. In this embodiment, the adjacent rows of fuel cells 151-170 are on half pitch displaced centers so that potentially damaging forces, e.g., uneven mechanical forces, are not directly transmitted through the array.

In the generators 52 (FIG. 2), 124 (FIG. 4) and 174 (FIG. 5) embodying the present invention, there is only one interconnection between the outer fuel electrode and the electrically conducting members. In the prior art generators, such as the generator 22 (FIG. 1), there are three interconnections between the outer fuel electrode and the conducting members. Thus as little as about 40% or less of the outer surface area of the fuel cells 1-18 of prior art generators 22 may be directly exposed to the plenum side gases. In generators embodying the present invention, up to about 80% or more of the outer surfaces of the fuel cells are directly exposed to the plenum side gases. Thus generators embodying the present invention are structurally more simple than are earlier generators and more easily assembled. In addition, they are less susceptible to energy losses due to the condition of the conducting members.

While certain preferred embodiments of the present invention have been shown and described, it is to be distinctly understood that the invention is not limited thereto but may be otherwise variously embodied within the scope of the following claims:

We claim:

1. A solid oxide full cell generator, comprising:
   a plenum;
   a first row of spaced apart, annular, axially elongated fuel cells each containing an outer electrode, in the plenum;
   a second row of spaced apart, annular, axially elongated fuel cells, each containing an outer electrode, the second row spaced from the first row in the plenum; and
   unit and electrically conducting member extending between the first row and the second row of fuel cells, electrically connecting the fuel cells in the first row in parallel with each other and in series with the fuel cells in the second row, where there are no electrically conducting side felt strips between the outer electrodes of adjacent fuel cells within each row.

2. The solid oxide fuel cell generator of claim 1, wherein the fuel cells of the one row have a cross-sectional profile and the electrically conducting member cross-sectional profile of the fuel cells in the first row.

3. The solid oxide fuel cell generator of claim 2, wherein the fuel cells of the second row have a cross-sectional profile and the electrically conducting member has a second surface with shaped portions conforming to the cross-sectional profile of the fuel cells in the second row.

4. The solid oxide fuel cell of claim 1, wherein the electrically conducting member comprises a felt.

5. The solid oxide fuel cell of claim 1, wherein the electrically conductive member comprises a foil.

6. The solid oxide fuel cell of claim 1, wherein the electrically conductive member comprises a composite of felt and foil.

7. The solid oxide fuel cell of claim 1, wherein the first row of fuel cells and the second row of fuel cells are arranged on a pitch of about one half of the diameter of the fuel cells.

8. The solid oxide fuel cell of claim 1, wherein the conducting member electrically connects no more than two fuel cells in parallel.

9. The solid oxide fuel cell of claim 8, wherein the conducting member electrically connects the two fuel cells in series with no more than two fuel cells of an adjacent row of fuel cells.

* * * * *